United States Patent Office 3,065,055
Patented Nov. 20, 1962

3,065,055
PRODUCTION OF CHROMIC ANHYDRIDE
Tom S. Perrin and Robert G. Banner, Painesville, Ohio, assignors to Diamond Alkali Company, Cleveland, Ohio, a corporation of Delaware
No Drawing. Filed Apr. 26, 1956, Ser. No. 580,713
5 Claims. (Cl. 23—145)

This invention relates to improvements in the manufacture of chromic anhydride, and more particularly relates to improvements in the manufacture of chromic anhydride by combining a saturated solution of alkali metal dichromate and sulfuric acid to precipitate a mass of crude chromic anhydride crystals in an aqueous mother liquor, separating the crude crystals from the mother liquor, and recovering solid chromic anhydride from the crystals, and still more particularly relates to improvements in such method in the steps following the separation of the crude crystals from the mother liquor.

It has heretofore been proposed to produce chromic anhydride as a non-crystalline solid by combining from 1 to 2½ parts by weight of concentrated sulfuric acid with 1 part by weight of a saturated solution of alkali metal dichromate to form a slurry of chromic anhydride crystals in an aqueous solution containing sulfuric acid, separating the crystals from the aqueous medium and subjecting the crystals to fusion at a temperature within the range of 190°–200° C.

In obtaining the crystals in a form suitable for fusion, various methods of treatment have been proposed, including dissolving the crystals in water to form a saturated solution thereof, and reprecipitating the chromic anhydride by the addition of sulfuric acid to the saturated solution followed by a second separation of crystals from the mother liquor, washing the crystals with nitric acid to remove adhering sulfuric acid, heating to expel residual nitric acid, and form a molten mass of chromic anhydride which is solidified upon cooling.

A further method which has heretofore been proposed includes adding sulfuric acid to a saturated solution of an alkali metal dichromate, the proportion of sulfuric acid employed being substantially within the range of 3–4.5 moles of sulfuric acid per mole of dichromate in the saturated solution, to cause precipitation of chromic anhydride crystals. Thereafter, the chromic anhydride crystals are separated from the aqueous sulfuric acid-containing mother liquor either by filtration, for example, by means of a filter wheel, or by centrifugation. Following the separation of the crystals from the grossly-held mother liquor, in accordance with this prior proposal, the crystals are further treated by washing with a saturated alkali metal dichromate solution, or by combining the crude chromic acid crystals with either a saturated solution of the alkali metal dichromate from which the chromic acid was precipitated, or with solid crystals of such dichromate.

The latter two methods have been directed, of course, to the transformation of the sulfuric acid to a liquefiable salt mixture as a means for disposing of the sulfuric acid, as well as the other impurities, associated with the crude crystals following separation from the mother liquor. One reason for this approach to the problem is that in most commercial processes for the manufacture of chromic anhydride from a saturated solution of dichromate, the crude chromic anhydride crytal mass is subsequently heated to the fusion point thereof, in order to separate the chromic anhydride from the impurities, the latter forming a layer of dross which is of lower specific gravity than the molten chromic anhydride. However, it has been deemed necessary to assure the presence of some dichromate in the layer of dross material, in order that the dross layer remain in a molten condition, since otherwise the bisulfate which also is associated with the crude chromic anhydride crystals forms a solid layer which renders separation of the molten chromic anhydride from the impurities extremely difficult.

The problem of maintaining the fluidity of the molten layer of impurities in the step in which the crude chromic anhydride crystals are subjected to fusion has, for some time, been a major one. It is not enough that the layer of impurities merely be fluid, but it is a matter, practically, of economic necessity in a large scale production, that the viscosity of molten layer of impurities be kept as low as possible, desirably approaching that of water. Otherwise, the vessel in which the crude crystals are subjected to fusion is not drained completely, following the melting of the crystals, and appreciable amounts of dross adhere to the melting vessel.

Moreover, there is the matter of corrosion of equipment when the melting vessel is fabricated from ordinary low-cost, so-called "stainless" steel. The presence of even small amounts of water associated with the crude crystals upon the fusion thereof, accelerates considerably the rate of corrosion of such equipment, and resort must be made to glass-lined equipment or highly expensive acid resisting alloys, if a satisfactory commercial product is to be obtained. The reason for the highly corrosive effect of the viscous dross material appears, in part, to be due to the comparatively high temperature at which the fusion is carried out (190°–200° C.), as well as the chemical activity of the mixture of sodium bisulfate and sodium bichromate at this temperature when the mixture also contains water, and is exposed to the stainless steel for extended periods of time.

One of the objects of the present invention is to provide a means for overcoming the corrosion difficulties previously encountered upon fusion of the crude chromic anhydride crystals, when either dichromate crystals or a solution thereof is combined with the crude crystals in order to insure fluidity of the layer of impurities upon fusion of the crude crystals.

Another object of the invention is to provide a means whereby the fluid layer of impurities obtained upon melting of the crude crystals, is maintained at a viscosity of the order of the viscosity of water, in order that the equipment in which the melting of the crude crystal mass is carried out, may be drained completely following the melting step.

These and other objects will be apparent to those skilled in the art from the description of the invention which is set forth hereinafter.

Accordingly, in the manufacture of chromic anhydride by the precipitation of chromic anhydride crystals from a saturated solution of alkali metal dichromate with concentrated sulfuric acid, and recovering solid chromic anhydride from the mass of said crude crystals resulting from such precipitation, the present invention is directed to that improvement which includes the steps of separating said mass of crude chromic anhydride crystals from the mother liquor, said crude crystals having free sulfuric acid and bisulfate associated therewith, adding to said mass of crude crystals an anhydrous alkali metal sulfate, the amount of said alkali metal sulfate being sufficient to react with said sulfuric acid to form alkali metal bisulfate, heating the thus-augmented mixture to a temperature sufficient to fuse said mixture to form a molten mass comprising a lower layer of chromic acid, and an upper layer of dross, and separating the molten chromic anhydride from the layer of molten dross.

In the practice of the method of the present invention, a saturated solution of an alkali metal dichromate, such as sodium dichromate, is combined with concentrated sulfuric acid, the amount of sulfuric acid being substantially within the range of 3.0–4.5 moles of sulfuric acid per mole of dichromate contained in the saturated solution thereof. The mixture of sulfuric acid and alkali metal dichromate is preferably maintained at a temperature of the order of 50–60° C., during the precipitation, since at temperatures lower than about 50° C., unnecessarily large amounts of alkali metal bisulfate are precipitated with the chromic acid crystals, and at temperatures substantially above 65° C., both alkali metal dichromate and chromic acid tend to decompose in the aqueous system.

Following the precipitation of the crude chromic anhydride crystals, the crystals are separated from the mother liquor by filtration, or by centrifugation, analyzed to determine their sulfuric acid content, and then transferred to the vessel in which they are to be fused.

The proportion of sulfuric acid which is associated with the crude crystals may be determined by taking a sample of the crude wet crystals and determining the total acidity thereof and calculating this as $H_2SO_4$, determining the sodium content of the sample and converting the amount of sodium therein to $NaHSO_4$ which in turn is calculated to terms of $H_2SO_4$, determining the amount of chromium in the sample and converting this to $CrO_3$ and to an amount of $H_2SO_4$ equivalent thereto. By subtracting from the total acidity as $H_2SO_4$, the amount of sodium acid sulfate and chromic anhydride equivalent to $H_2SO_4$, the free $H_2SO_4$ in the crude crystal mass is obtained. The amount of water in the crude crystal mass is determined by summation of the percentages of $H_2SO_4$, $NaHSO_4$, and $CrO_4$, and subtracting this sum from 100%. The molar proportion of alkali metal sulfate, for example, sodium sulfate, in the event that the chromic acid crystals are precipitated from a saturated solution of sodium dichromate, is then combined with the crude crystals in an amount somewhat in excess of the molar amount of sulfuric acid in the crystals. Thus, the amount of sodium sulfate which may be added, is preferably above about 1.02 moles of sodium sulfate per mole of sulfuric acid in the crystals, or about 1.5 parts by weight of sodium sulfate per part by weight of sulfuric acid. The amount of sulfate added is not critical in the sense that restrictions on the excess result in failure to maintain fluidity in the molten dross layer in the subsequent fusion step, since in accordance with further provisions of the present invention, the fluidity may be controlled by addition of sulfuric acid to the dross layer to convert the excess sulfate to bisulfate.

The crystals, combined with the sodium sulfate which preferably also contains some sodium dichromate, or sodium chromate, is heated to the fusion point thereof, i.e., substantially within the range of 190°–200° C. The lower-most temperature within this range is given for the reason that the crude crystals begin to melt at this temperature and at temperatures substantially above 197° C., the rate of decomposition of the chromic acid becomes sufficiently rapid to impair the operation of the process economically. Moreover, dichromate associated with the bisulfate of the dross layer, lowers the melting point of the dross layer to a temperature which is also within this range, assuring the presence of two separable molten layers in the melter.

The use of alkali metal sulfate, for example sodium sulfate as a means for transforming the free sulfuric acid associated with the crystals to a liquefiable salt at the temperatures employed in the melting step hereof, provides several advantages not found in prior proposals. First, the addition of dichromate to the crude crystals is not necessary to assume fluidity of the dross layer, since the dross is fluid at the melting point of chromic anhydride. Second, in the event a substantial excess of sodium sulfate is added to the crude crystals, and the desired degree of fluidity does not obtain, concentrated sulfuric acid may be added to the dross layer to correct this condition. In this regard two readily observable characteristics of the dross layer may be used as guides in establishing when the proper amount of acid has been added; the first of these is, of course, the change in viscosity of dross to the desired degree, and the second is a color change from reddish orange to brownish green. The color change appears to be the result of diffusion of a small amount of chromic acid itno the dross layer and the subsequent reduction thereof upon the addition of sulfuric acid at the temperatures of the molten mass. The change in viscosity, or fluidity, of the dross layer upon the addition thereto of sulfuric acid, is not accounted for with certainty at the present time.

It is desirable to agitate the mass of crude chromic anhydride crystals and combined sulfate during the fusion step in order to facilitate separation of the pure chromic anhydride from the molten layer of dross, and thereby provide a highly purified chromic anhydride in the molten state. The molten chromic anhydride can be withdrawn from the melter and transferred to a flaking drum or the like, without additional purification steps. If agitation is employed in this step of the process, comparatively gentle agitation is all that is required for complete separation of the molten chromic anhydride, and the molten dross layer, and at the same time assure a minimum rate of corrosive attack upon the equipment under the conditions existing in the melter. If vigorous agitation of the melting mass of material is undertaken, a higher rate of corrosive attack upon equipment is to be expected.

In order that those skilled in the art may better understand the invention and the manner in which the same may best be carried into effect, the following specific example is offered.

*Example*

A saturated sodium dichromate liquor is combined continuously with sulfuric acid in a vessel equipped with a recirculating pump which withdraws material from the bottom of the vessel, recirculates a portion thereof to the top of the vessel, and transfers the remaining portion removed from the bottom of the vessel to a continuously operating rotary filter. The amount of sulfuric acid which is combined with the sodium dichromate liquor is maintained within the range of 3.0–4.0 moles of sulfuric acid per mole of sodium dichromate liquor being fed to the vessel. The residence time calculated for the mixture of sulfuric acid and dichromate liquor in the vessel is from 15 to 30 minutes. The crystal slurry of chromic acid in mother liquor is withdrawn from the bottom of the vessel, a portion thereof returned to the top of the vessel as described above, and the remaining portion transferred continuously to a tank in which a rotary filter separates the crystals from the grossly-held mother liquor.

The crystals are continuously removed from the filter wheel as a moving stream at the rate of 1250 pounds per hour. The crystals are fed to one of a plurality of melting vessels arranged to receive the crude crystals in the amount of about 625 pounds each. The crystals are analyzed and found to contain about 2% free $H_2SO_4$. This is determined by the method noted hereinabove.

After 625 pounds of the crude chromic anhydride crystals are accumulated in a melter, there is added thereto about 55 pounds of "chrome salt cake" (sodium sulfate containing about 1% of sodium dichromate) which is a by-product of the manufacture of sodium dichromate from sodium chromate liquors.

The crystals, combined with the sodium sulfate containing sodium dichromate, are gently agitated while being heated to a temperature within the range of 190°–200° C. for a period of about 15 minutes. During this time it is observed that the dross layer which forms on top of the molten chromic anhydride has a reddish orange tinge. There is then added to the molten layer of dross about 24 pounds of 66° Bé. sulfuric acid, this amount of acid being that required to convert the excess sodium sulfate to bisulfate with a very small amount of free sulfuric acid remaining as such.

Following the addition of sulfuric acid to the molten dross layer, it is observed that the dross layer changes from a reddish orange tint to a brownish-green tint, and that the viscosity decreases substantially.

The molten chromic anhydride layer is withdrawn from the bottom of the melter and transferred to a flaking drum, the melter being drained until the brownish-green layer of dross is in evidence in the effluent. The layer of dross amounting to 137 pounds, is then withdrawn from the melter, and it is observed that this material has a viscosity of the order of the viscosity of water at the temperatures employed. The melting tank is drained completely, and does not require washing in order to remove substantially all of the dross material. Hence, additional portions of crystals from the filter wheel together with dichromate-containing sulfate, may be added to the melter immediately.

Essentially, the same procedure is followed, using the same amounts of materials, as described immediately above, except that C.P. grade (chemically pure) sodium sulfate is used in place of the "chrome salt cake" referred to above. The separation of dross and chromic anhydride layers is the same as that described above, with the same color and viscosity changes noted.

The materials of construction in the melting tank is so-called "mild" steel, and over extended periods of time, it is noted that by the addition of sodium sulfate to the crude chromic anhydride crystal mass in the melter, the rate of corrosion of the equipment is reduced to about $\frac{1}{20}$ that obtained with either a saturated solution of sodium dichromate, or sodium dichromate crystals, are added to the crude chromic anhydride crystal mass to react with the free sulfuric acid associated therewith.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In the manufacture of chromic anhydride by the precipitation of crude chromic anhydride crystals from a saturated solution of alkali metal dichromate with concentrated sulfuric acid, and recovering solid chromic anhydride from the mass of crude crystals resulting from such precipitation, the improvement which includes the steps of separating said mass of crude chromic anhydride crystals from the mother liquor, said crude crystals having sulfuric acid and alkali metal dichromate solution associated therewith, adding to said mass of said crystals an alkali metal sulfate, the amount of said sulfate being sufficient to react with said sulfuric acid to form alkali metal bisulfate, heating the thus-augmented mixture to a temperature sufficient to fuse said mixture to form a molten mass consisting of a lower layer of chromic anhydride and an upper layer of dross, and separating the molten chromic anhydride layer from the layer of molten dross.

2. The method of claim 1 wherein said alkali metal dichromate is sodium dichromate, said alkali metal sulfate is sodium sulfate, and the amount of sodium sulfate added to said crude crystals is in excess of about 1.5 parts of such sulfate per part of free sulfuric acid remaining with said crystals.

3. The method of claim 2 wherein sulfuric acid is added to the molten layer of dross to the point where any excess of said sulfate over that required to react with the free sulfuric acid of said crystals is converted to bisulfate.

4. The method of claim 3 wherein the sulfuric acid added to said layer of dross in course, is sufficient to change the color of said molten dross layer from reddish orange to greenish-brown, as a measure of the excess of said sodium sulfate over that required to react with said free sulfuric acid of said crystals.

5. The method of claim 3 wherein the sodium sulfate also contains a small amount of sodium dichromate.

References Cited in the file of this patent

UNITED STATES PATENTS

| 841,278 | Suchy | Jan. 15, 1907 |
| 1,857,548 | Humphries | May 10, 1932 |
| 2,632,688 | Perrin | Feb. 15, 1952 |

FOREIGN PATENTS

| 338,938 | Great Britain | Dec. 1, 1930 |
| 739,760 | Great Britain | Nov. 2, 1955 |

OTHER REFERENCES

Mellor: "Comprehensive Treaties on Inorganic and Theoretical Chemistry," Longmans, Green & Co., N.Y., 1923, vol. 2, pages 680–682.

UNITED STATES PATENT OFFICE
CERTIFICATE OF CORRECTION

Patent No. 3,065,055                        November 20, 1962

Tom S. Perrin et al.

It is hereby certified that error appears in the above numbered patent requiring correction and that the said Letters Patent should read as corrected below.

Column 3, line 32, for "$CrO_4$" read -- $CrO_3$ --; line 70, for "assume" read -- assure --; column 6, line 19, after "of" insert -- said --.

Signed and sealed this 17th day of September 1963.

(SEAL)
Attest:

ERNEST W. SWIDER                        DAVID L. LADD
Attesting Officer                         Commissioner of Patents